US000001253H

United States Statutory Invention Registration [19]

[11] Reg. Number: H1253

Hwo et al.

[43] Published: Nov. 2, 1993

[54] POLYMER BLENDS

[75] Inventors: Charles C. Hwo, Sugar Land; Jerry W. Secrist; William J. Graff, both of Houston, all of Tex.

[73] Assignee: Shell Oil Company, Houston, Tex.

[21] Appl. No.: 793,894

[22] Filed: Nov. 18, 1991

[51] Int. Cl.[5] ..... C08L 53/00
[52] U.S. Cl. ..... 524/505
[58] Field of Search ..... 524/98, 505

[56] References Cited

U.S. PATENT DOCUMENTS

| | | | |
|---|---|---|---|
| 3,113,986 | 12/1963 | Breslow et al. | 260/683.9 |
| 3,817,821 | 6/1974 | Gallini | 161/165 |
| 3,879,492 | 4/1975 | Bontinick | 260/857 |
| 4,081,424 | 3/1978 | Gergen et al. | 524/505 |
| 4,107,130 | 8/1978 | Gergen et al. | 524/505 |
| 4,110,303 | 8/1978 | Gergen et al. | 524/505 |
| 4,226,952 | 10/1980 | Halasa et al. | 525/192 |
| 4,554,321 | 11/1985 | Hwo et al. | 525/240 |
| 4,665,130 | 5/1987 | Hwo | 525/222 |
| 4,769,721 | 9/1988 | Kajuira | 360/10.1 |
| 4,808,662 | 2/1989 | Hwo | 525/74 |
| 4,870,134 | 9/1989 | Hwo | 525/221 |
| 4,882,229 | 11/1989 | Hwo | 428/461 |

FOREIGN PATENT DOCUMENTS 0198091 10/1986 European Pat. Off. .

OTHER PUBLICATIONS

"Modern Plastics Encyclopedia", vol. 45 (1968) pp. 532–536.

*Primary Examiner*—Robert L. Stoll
*Assistant Examiner*—Joseph D. Anthony
*Attorney, Agent, or Firm*—James O. Okorafor

[57] ABSTRACT

Polymer blends of improved properties for use in packaging applications comprise blends of a crystalline poly(1-butene) and a selectively hydrogenated block copolymer of vinyl aromatic hydrocarbon and conjugated alkadiene of the SEBS type.

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER BLENDS

FIELD OF THE INVENTION

This invention relates to polymer blends of improved properties. More particularly, the invention relates to blends of polyolefin, especially polybutene, with a selectively hydrogenated block copolymer.

BACKGROUND OF THE INVENTION

The polymerization of olefins, particularly lower α-olefins, to produce polyolefin polymers has become an industry of substantial significance. The polyolefin polymers have gained widespread commercial acceptance because of the relatively low cost of the polymers and the desirable properties they possess. Moreover, a wide variety of such properties are available depending in part on the choice of monomer to be employed in the polyolefin production. There are some instances, however, where it is desirable to modify the properties of a polyolefin polymer in order to meet the requirements of some particular application. One such method of modification is by the production of copolymers of more than one olefinic monomer. For example, a random copolymer of ethylene and propylene demonstrates properties of elasticity that are not available from either ethylene or propylene homopolymer.

An alternate method of modifying the properties of a polyolefin polymer is through the provision of a polymer blend, e.g., blends of a polyolefin with another polyolefin or with other polymeric materials. For example, U.S. Pat. No. 4,189,519 describes a blend of a copolymer of ethylene and an unsaturated ester with a high molecular weight polybutene. The blend demonstrates better heat sealing properties than either single blend component.

Polymeric materials of suitable properties have shown substantial utility in the field of packaging as the use of plastic containers becomes more widespread. A substantial proportion of plastic containers and film wraps have been made from polyvinyl chloride. However, with the possible health and environmental problems associated with the use of polyvinyl chloride becoming more apparent, the use of other polymers or polymeric compositions of properties similar to those of polyvinyl chloride has become of wider interest. Polymers and copolymers of poly(1-butene), as well as blends thereof, have shown substantial utility in packaging applications, particularly those involving film. By way of illustration, U.S. Pat. No. 3,817,821 describes blends of polyvinyl alcohol and poly(1-butene) for packaging films. U.S. Pat. No. 3,879,492 discloses blends of poly(1-butene), styrene-butadiene copolymers, high and low density polyethylene and polyisobutylene. These and other blends of poly(1-butene) with other polymeric materials are known to have properties useful in packaging applications and better than those of poly(1-butene) when used alone. However, it would be of advantage to provide additional blends of poly(1-butene) and other polymers, where the blends demonstrate properties which are improved and also similar to those of polyvinyl chloride.

SUMMARY OF THE INVENTION

The present invention provides novel blends of polyolefin and other polymeric material. More particularly, the invention provides blends of poly(1-butene) and selectively hydrogenated block copolymer of a vinyl aromatic compound and a conjugated alkadiene. The blends of the invention demonstrate properties advantageously employed in the production and use of films and film laminates for packaging applications.

DESCRIPTION OF THE FIGURES

FIG. 1A describes the relationship when the stress is applied in the machine direction. FIG. 1B describes the relationship when the stress is applied in the transverse direction.

DESCRIPTION OF THE INVENTION

Figure 1A:
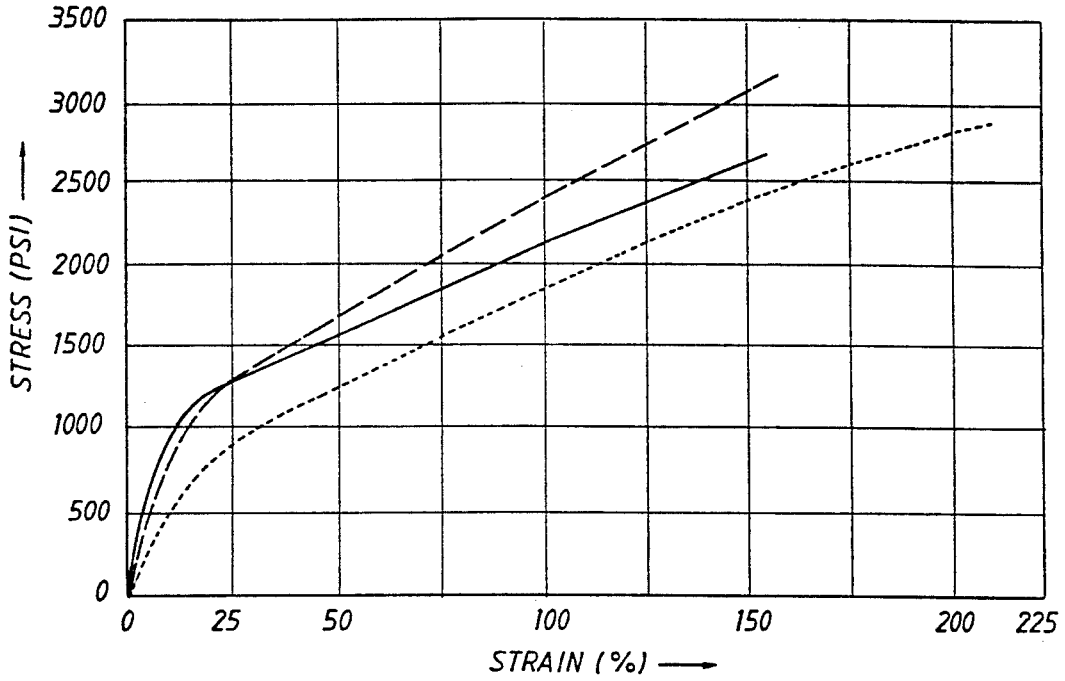
FIGS. 1A and 1B depict a stress-strain relationship for each of three polymeric films. These relationships were developed by the general procedure of Illustrative Embodiment II as found below. The solid line represents a monolayer of blown film of polyvinyl chloride. The dashed line represents the relationship observed for a three-layer laminate wherein the outer layers are ethylene-vinyl acetate copolymer and the inner or core layer is a poly(1-butene) marketed by Shell Chemical Company as PB8640. The dotted line also represents the stress-strain relationship of a three-layer laminate having ethylene-vinyl acetate outer layers but one in which the inner layer is a 2:1(by weight) blend of PB8640 and a selectively hydrogenated block copolymer of styrene and butadiene of the SEBS type marketed by Shell Oil Company as KRATON ®G 1652 Thermoplastic Rubber.
Figure 1B:
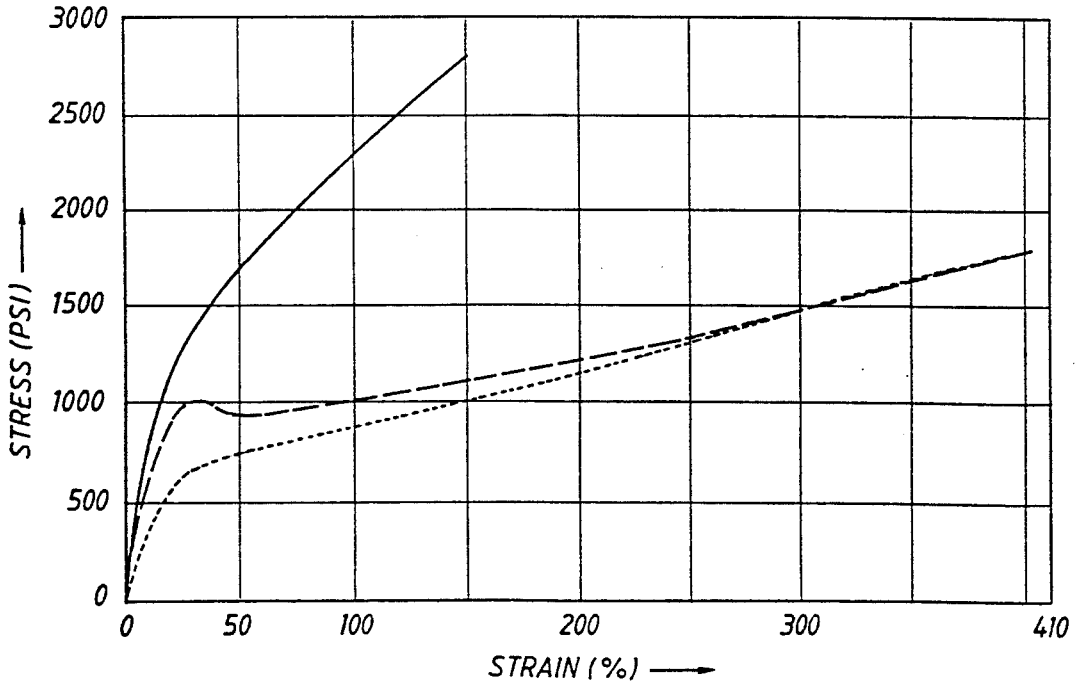

The blends of the invention are blends of polymerized 1-butene with a selectively hydrogenated block copolymer of vinyl aromatic hydrocarbon and a conjugated alkadiene. The blends have certain properties improved over those of either blend component that make the blends particularly useful in packaging applications.

The poly(1-butene) polymer component of the blends of the invention is a crystalline poly(1-butene) having at least a major proportion of monomeric units as 1-butene units with no more than a minor proportion of monomeric units derived from other α-olefins of up to 14 carbon atoms inclusive. The poly(1-butene) polymers useful as blend components, have up to 30% mole of monomeric units such as ethylene, propylene, 1-hexene, 4-methyl-1-pentene, 1-Octene or 1-tetradecene. Such polymers, although technically copolymers, are known and understood in the art as poly(1-butene) polymers. Poly(1-butene) polymers, which are homopolymeric poly(1-butene); are preferred, but when other α-olefin is present, amounts of such α-olefin from about 0.1% mole to about 20% mole are preferred.

The degree of crystallinity of the poly(1-butene) polymer is typically from about 10% to about 60% as measured by X-ray diffraction methods. The crystallization temperature of such polymers, as measured by a differential scanning calorimeter, is from about 30° C. to about 90° C. The intrinsic viscosity, as measured in a conventional capillary viscosity measuring device in decalin at 135° C., is typically from about 0.8 dl/g to about 8 dl/g, more often from about 1 dl/g to about 6 dl/g. Such poly(1-butene) polymers are well known and conventional and a number are marketed by Shell Chemical Company.

The second component of the blends of the invention is a selectively hydrogenated block copolymer of a vinyl aromatic hydrocarbon compound and a conjugated alkadiene. The block copolymer, prior to the selective hydrogenation thereof, is a thermoplastic elastomer of at least one block of at least predominantly polymerized vinyl aromatic hydrocarbon (Block A) and at least one block of at least predominantly polymerized conjugated alkadiene (Block B).

The vinyl aromatic hydrocarbon, useful as the precursor of an A block, has a vinyl group, i.e., a

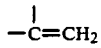

group, attached directly to an aromatic ring and has up to 12 carbon atoms inclusive. Preferred vinyl hydrocarbons are styrene and styrene homologs such as those of the formula

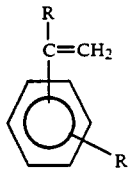

(I)

wherein R independently is hydrogen or alkyl of up to 4 carbon atoms inclusive. Illustrative of the vinyl aromatic hydrocarbons are styrene, p-methylstyrene, p-ethylstyrene, m-propylstyrene, α-ethylstyrene, α-methylstyrene and α-4-dimethylstyrene. Styrene and α-methylstyrene are a preferred class of vinyl aromatic hydrocarbon compounds and particularly preferred is styrene.

Each A block of the block copolymer independently is at least predominantly the polymerized vinyl aromatic compound and preferably is homopolymeric. Alternatively, however, one or more A blocks is a block wherein some of the monomer of block B is copolymerized with the predominant vinyl aromatic hydrocarbon. Such blocks are termed "tapered" and have at least 85% by mole and preferably at least 93% by mole of the polymerized vinyl aromatic hydrocarbon with any remainder being the conjugated alkadiene of B block. The A blocks containing a mixture of two or more vinyl aromatic hydrocarbons are also suitable but are less preferred. The average molecular weight of an A block is typically from about 1000 to about 125,000 but A blocks of average molecular weight from about 7000 to about 125,000 are preferred and average molecular weight A blocks from about 7000 to about 60,000 are particularly preferred.

Each B block of the block copolymer independently is a block of at least predominantly polymerized conjugated alkadiene. The alkadienes, useful as the predominant monomer for a B block, are conjugated alkadienes of up to 8 carbon atoms such as those of the formula

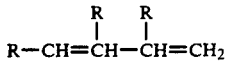

(II)

wherein R has the previously stated significance. Illustrative of such alkadienes are 1,3-butadiene (butadiene), 2-methyl-1,3-butadiene (isoprene), 2,3-dimethyl-1,3-butadiene, 1,3-pentadiene (piperylene), 1,3-octadiene, and 2-methyl-1,3-hexadiene. Preferred conjugated alkadienes are butadiene and isoprene, particularly butadiene. Each B block is at least predominantly polymerized conjugated alkadiene with the B block being at least 85% by mole and preferably at least 93% by mole of polymerized alkadiene with any remainder being the vinyl aromatic compound of block A, in the case of the tapered blocks. Homopolymeric B blocks are preferred although tapered B blocks and B blocks containing mixed alkadienes are also satisfactory. Within a polymerized alkadiene block two modes of polymerization are possible and both are generally observed. In what is termed 1,4 polymerization, each carbon atom of the four carbon nucleus of the alkadiene is incorporated within the polymer chain which then includes two carbon atoms joined by an ethylene linkage. In 1,2 polymerization, the polymerization involves only one carbon-carbon double bond of the conjugated alkadiene. The carbon atoms of that double bond will be incorporated into the polymer chain which will have a pendant vinyl group. Control of these two modes of polymerization is well known and within the skill of the art. Preferred block copolymers are those wherein from about 25% to about 100% of the units of each B block are the result of 1,2 polymerization, preferably from about 35% to about 55%. The average molecular weight of a B block is suitably from about 10,000 to about 450,000, preferably from about 10,000 to about 150,000.

Within the block copolymer, when the A block content is not more than about 55% by weight, the block copolymer has the characteristics of a thermoplastic elastomer. Higher A block contents produce polymers with resinous characteristics which are not suitable in the blends of the invention. Preferably, the total A block content will be from about 2% by weight to about 55% by weight based on total copolymer. Contents of total A block from about 10% by weight to about 40% by weight on the same basis are preferred. The total average molecular weight of the block copolymer will be from about 11,000 to about 2,500,000, preferably from about 25,000 to about 350,000, more preferably from about 35,000 to about 300,000. These average molecular weights are determined by conventional techniques such as gel permeation chromatography or by gel permeation-low angle light scattering.

The structure of block copolymers in general can be varied and will depend upon the method of production. The block copolymer precursors of the selectively hydrogenated components of the blends of the invention are termed linear and, in one modification, are produced by the sequential polymerization of the blocks. The polymerization typically takes place in the presence of an initiator such as an alkyllithium compound as is well known in the art. In the preparation of a three-block or triblock polymer, the vinyl aromatic hydrocarbon compound of the A block is polymerized using a mono-functional initiator. The conjugated alkadiene of the B block is then introduced and subsequently additional vinyl aromatic hydrocarbon for a second A block is provided. Such a three block copolymer is conventionally characterized as an ABA polymer. A two block polymer or diblock polymer is produced by polymerizing the vinyl aromatic hydrocarbon compound to form an A block and then providing conjugated alkadiene for form a B block. Such a polymer is characterized as an AB polymer. Substantially complete polymerization of each block prior to introducing the monomer of the next block will result in the production of homopolymeric blocks. If, however, prior to the substantially complete polymerization of the monomer of any one block, the monomer of the next block is added the blocks will be tapered. Similar sequential polymerization techniques are employed to produce block copolymers characterized as ABABA, ABAB or ABABABA or polymers of an even higher number of blocks. Production of linear block copolymers of at least three blocks is alternatively accomplished by the use of a difunctional initiator to grow the blocks "inside out". The conjugated alkadiene is provided to the initiator to produce a B block and A blocks are grown on each end to produce an ABA polymer. These and other methods of producing linear block copolymers of these types are well known and conventional in the art.

The linear block copolymers most useful as the precursors of the selectively hydrogenated block copolymer blend components are of the following types:

polystyrene-polybutadiene (SB)
polystyrene-polyisoprene (SI)
polystyrene-polybutadiene-polystyrene (SBS)
polystyrene-polyisoprene-polystyrene (SIS)

Block copolymers of the above SBS type are preferred. These block copolymers are conventional and a number are commercial, being marketed by Shell Chemical Company as KRATON® Thermoplastic Rubber.

To prepare the blend components of the invention, the base block copolymers are selectively hydrogenated by a process sufficient to hydrogenate no more than about 25% and preferably no more than about 5% of the aromatic unsaturation present in the block copolymer but sufficient to hydrogenate from about 80% to about 99% of the aliphatic unsaturation present in the B block. Such hydrogenation is well known and conventional and is accomplished by conventional methods illustrated by U.S. Pat. No. 3,113,986 and U.S. Pat. No. 4,226,952. The selectively hydrogenated block copolymer is often identified by the structure of the block copolymer precursor with regard to A block, and by the "apparent" structure of the aliphatic block. Thus, selective hydrogenation of an SBS polymer will result in a polymer having a hydrogenated mid-block which is apparently polyethylene in the case of a mid-block produced by 1,4-polymerization and a mid-block which is apparently ethylene/butylene copolymer in the case of an SBS polymer wherein the mid-block is produced by predominantly 1,2 polymerization. These selectively hydrogenated block copolymers would be characterized as SES or SEBS respectively. Corresponding diblock polymers would be termed SE or SEB. The polymer produced by selective hydrogenation of an SIS block copolymer of a high degree of 1,4 polymerization is termed an SEPS because of the similarity of the hydrogenated mid-block to an ethylene/propylene copolymer. The preferred selectivity hydrogenated block copolymers for use as blend components of the invention are of the SES/SEBS type wherein the majority of the hydrogenated mid-blocks are of the E type with the remainder being of the EB type. The selectively hydrogenated block copolymers of these types are also well known and a number are commercial, being marketed by Shell Chemical Company as KRATON®G Thermoplastic Rubber.

The composition of the blends of the invention is material but not critical. Proportions by weight of the poly(1-butene) and the selectively hydrogenated block copolymer from about 5:1 to about 1:5 are suitable. However, blends having weight proportions of poly(1-butene) to selectively hydrogenated block copolymer from about 2:1 to about 1:2 are preferred.

The blends of the invention are produced by methods which are well known for the production of intimate blends of polymeric materials. In one embodiment, the blends are produced by dry blending. In a second embodiment, the blends are produced in a mixing device such as a blender operating at high shear. In a preferred embodiment, the blends are produced in an extruder whereby the blend is formed as an extrudate. The blends may also contain a variety of additives conventional for polymeric materials such as antioxidants, UV stabilizers, dyes, pigments and fire retardant chemicals which are provided together with or separate from the blend components.

Figure 2:
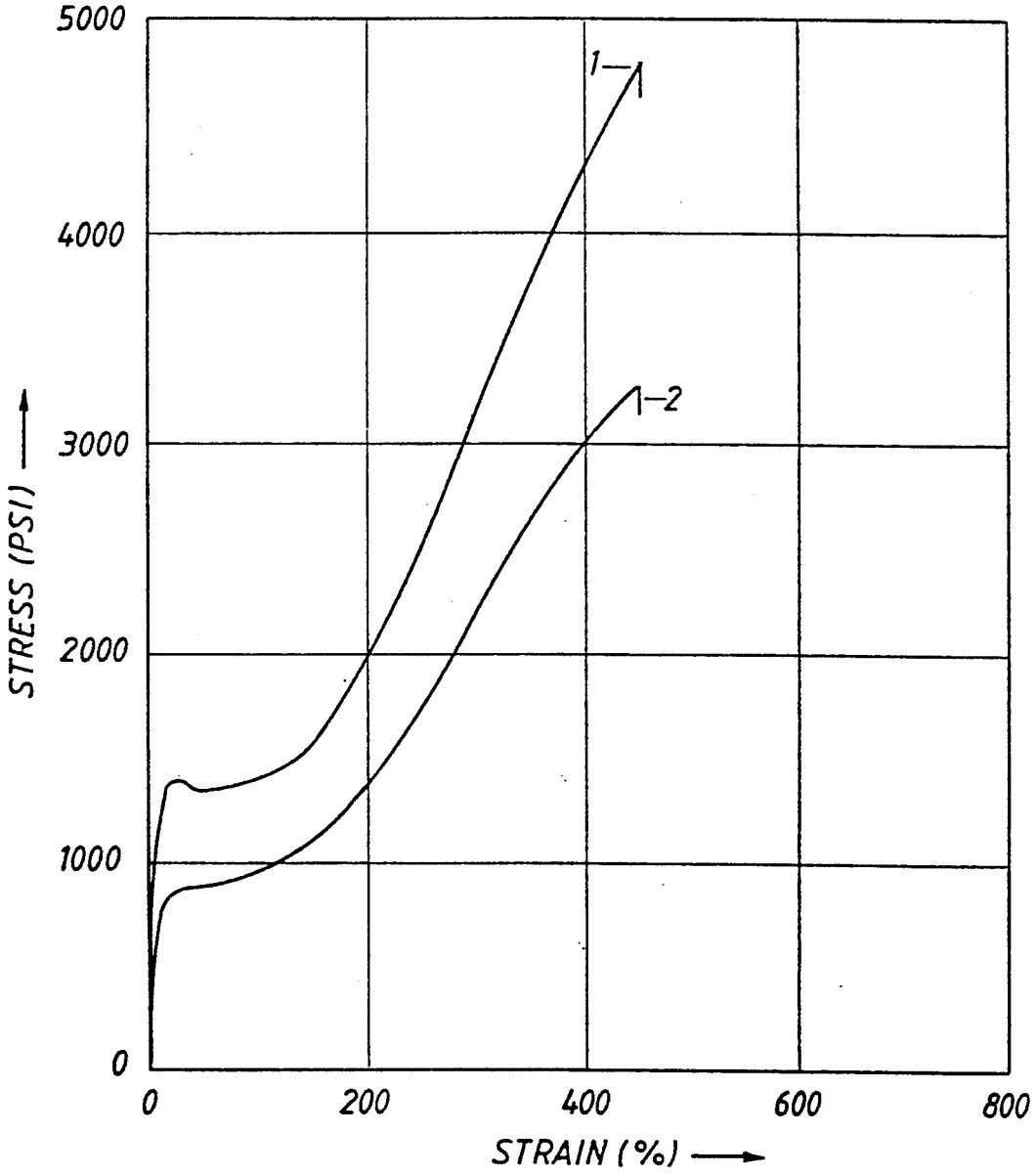
FIG. 2 represents the stress-strain relationship of two single polymers determined by the procedure of Illustrative Embodiment II. The line 1 represents the relationship for PB8640. The line 2 depicts the relationship for the 2:1 blend of PB8640 and KRATON ®G 1652 Thermoplastic Rubber.

The poly(1-butene) and selectively hydrogenated block copolymer blends are particularly useful as films or as components of laminated films where the properties of optical clarity and a relatively constant stress-strain relationship (see FIG. 2, for example) enables use of the blends in packaging applications which have traditionally employed polyvinyl chloride. A particularly suitable use is in film wrapping for food products where clarity is required and the relatively constant stress-strain relationship provides for neat and snug wraps. The blends are useful as single layer films but in preferred modifications the blends are employed in laminates with other polymer layers such as nylon, polyester, high density polyethylene or ethylene-vinyl acetate copolymer. Such laminates are produced by conventional methods such as coextrusion of the layers or by separate extrusion of layers with an adhesive used to produce the laminate. The preferred laminates, when the blends are employed as laminates, have the blend as the central or core layer with outer layers of other polymeric material, especially ethylene-vinyl acetate copolymer.

The invention is further illustrated by the following Illustrative Embodiments which should not be regarded as limiting.

Illustrative Embodiment I

A blend was produced from a commercial poly(1-butene), marketed by Shell Chemical Company as PB8640, having a melt index of about 1g/10 minutes and a density of about 0.910g/cm$^3$ with a selectively hydrogenated styrene/butadiene block copolymer of the SEBS type marketed by Shell Chemical Company as KRATON®G 1652. The blend was produced by mixing the polymer components and passing the resulting mixture through a Brabender mixer operating at 190° C. and a rpm of 100.

Produced by this method were blends of poly(1-butene) and the selectively hydrogenated block copolymer in a weight ratio of 2:1 (Blend A), a weight ratio of 1:1 (Blend B) and a weight ratio of 1:2 (Blend C).

Illustrative Embodiment II

From each of the blends prepared by the method of Illustrative Embodiment I, sample strips of a "dumbbell" configuration, of 1 inch dimension between the "bells", were produced by compression molding. The strips were evaluated for stress/strain relationships and also evaluated was a similar strip produced from unblended poly(1-butene) (PB). The response to stress of the strips was determined by rapidly separating two portions of each strip which were gripped 2.5 inches apart. The separation was at the rate of 20 inches/minute and the separation was stopped when the strip broke. The conditions of the evaluation were ambient and the evaluation was made with a Instron Extensometer. Table I provides the dimensions of the strips of Blend A evaluated and Table II provides the results of that evaluation.

TABLE I

| Specimen | Thickness (in) | Width (in) |
|---|---|---|
| 1 | 0.069 | 0.130 |
| 2 | 0.069 | 0.129 |
| 3 | 0.069 | 0.131 |
| 4 | 0.069 | 0.130 |
| 5 | 0.068 | 0.129 |
| PB | 0.070 | 0.122 |

TABLE II

| Specimen | Load @ Break (lbs) | Stress, @ Break (psi) | Strain @ Break (%) |
|---|---|---|---|
| 1 | 30.49 | 3396 | 447.9 |
| 2 | 28.74 | 3229 | 418.1 |
| 3 | 28.49 | 3152 | 402.2 |
| 4 | 28.32 | 3157 | 414.1 |
| 5 | 29.35 | 3345 | 448.9 |
| PB | 39.83 | 4664 | 398.0 |

Table III provides the dimensions of strips of Blend B evaluated and Table IV provides the results of that evaluation.

TABLE III

| Specimen | Thickness (in) | Width (in) |
|---|---|---|
| 1 | 0.070 | 0.131 |
| 2 | 0.074 | 0.129 |
| 3 | 0.073 | 0.132 |
| 4 | 0.075 | 0.131 |
| 5 | 0.071 | 0.133 |

TABLE IV

| Specimen | Load at Break (lbs) | Stress at Break (psi) | Strain at Break (%) |
|---|---|---|---|
| 1 | 27.43 | 2992 | 428.0 |
| 2 | 30.72 | 3219 | 453.8 |
| 3 | 29.62 | 3074 | 454.8 |
| 4 | 28.39 | 2889 | 418.1 |
| 5 | 27.41 | 2903 | 439.9 |
| PB | 39.83 | 4664 | 398.0 |

Table V provides the dimensions of strips of Blend C evaluated and Table VI provides the results of that evaluation.

TABLE V

| Specimen | Thickness (in) | Width (in) |
|---|---|---|
| 1 | 0.0700 | 0.129 |
| 2 | 0.0700 | 0.128 |
| 3 | 0.0710 | 0.128 |
| 4 | 0.0690 | 0.128 |
| 5 | 0.0690 | 0.127 |

TABLE VI

| Specimen | Load at Break (lbs) | Stress at Break (psi) | Strain at Break (%) |
|---|---|---|---|
| 1 | 29.97 | 3319 | 470.7 |
| 2 | 49.61 | 5537 | 566.0 |
| 3 | 44.92 | 4942 | 544.2 |
| 4 | 43.28 | 4901 | 522.3 |
| 5 | 28.87 | 3295 | 459.8 |

TABLE VI-continued

| Specimen | Load at Break (lbs) | Stress at Break (psi) | Strain at Break (%) |
|---|---|---|---|
| PB | 39.83 | 4664 | 398.0 |

Illustrative Embodiment III

By the procedure of Illustrative Embodiment I and II, sample strips were prepared from a poly(1-butene) marketed by Shell Chemical Company as PB 0200 and KRATON ®G 1652. The strips were evaluated by the procedure of Illustrative Embodiment II. The results are given in table VII.

TABLE VII

| Ratio PB 0200:KRATON ® G 1652 | Stress at Break, psi | Strain at Break, % |
|---|---|---|
| 2:1 | 2922 | 389 |
| 1:1 | 3262 | 479 |
| 1:2 | 4007 | 509 |

Illustrative Embodiment IV

The tensile and optical properties were determined for: 1) a film of polyvinyl chloride of 13 micron thickness (Sample X), 2) a three-layer laminate of 25 micron thickness where the outer layers are ethylene-vinyl acetate copolymer and the inner layer is PB8640 (Sample Y), and 3) a similar laminate where the inner layer is a 2:1 blend of PB8640 and KRATON ®G 1652 (Sample Z). The results are shown in Tables VIII, IX, and X.

TABLE VIII

| | Tensile - Machine Direction | | |
|---|---|---|---|
| Sample | Modulus | Stress at Break, psi | Strain at Break, % |
| X | 26103 | 3282 | 143 |
| Y | 12930 | 3140 | 180 |
| Z | 8820 | 2789 | 187 |

TABLE IX

| | Tensile - Transverse Direction | | |
|---|---|---|---|
| Sample | Modulus | Stress at Break, psi | Strain at Break, % |
| X | 7617 | 2944 | 139 |
| Y | 12473 | 1755 | 400 |
| Z | 6433 | 1716 | 401 |

TABLE X

| | Optical | | | |
|---|---|---|---|---|
| | Gloss, angle of measurement | | | |
| Sample | 45° | 60° | Haze, % | Clarity, % |
| X | 89.2 | 142.0 | 0.3 | 84.4 |
| Y | 84.2 | 124.5 | 1.6 | 30.5 |
| Z | 81.2 | 115.3 | 0.9 | 3.4 |

What is claimed is:

1. A laminate film having superior stress-strain and optical properties produced from a polymer blend comprising a crystalline poly(1-butene) and a selectively hydrogenated block copolymer of a vinyl aromatic hydrocarbon and a conjugated alkadiene.

2. The film laminate of claim 1 wherein the blend is a core layer and the outer layers are nylon, polyester, polypropylenes, polyethylene or ethylenically-unsaturated ester copolymers.

3. The film laminate of claim 2 wherein the outer layers are ethylene-vinyl acetate copolymer.

4. The blend of claim 1 wherein the selectively hydrogenated block copolymer is a block copolymer derived from a base block copolymer having at least one block of at least predominantly polymerized styrene or o-methylstyrene and at least one block of at least predominantly polymerized butadiene or isoprene, wherein no more than about 25% of the aromatic unsaturation has been hydrogenated and from about 88% to about 99% of the aliphatic unsaturation has been hydrogenated.

5. The blend of claim 4 wherein the weight ratio of poly(1-butene) to selectivity hydrogenated block copolymer is from about 5:1 to about 1:5.

6. The blend of claim 5 wherein the poly(1-butene) contains up to about 30% mole of other $\alpha$-olefin of up to 14 carbon atoms inclusive.

7. The blend of claim 6 wherein the base block copolymer from which the selectively hydrogenated block copolymer is derived is of the SBS type.

8. The blend of claim wherein the poly(1-butene) is homopolymeric.

9. The blend of claim 8 wherein the selectively hydrogenated block copolymer is of the SEBS type.

10. A three-layer film laminate wherein the outer layers are nylon, polyester, polypropylenes, polyethylenes or ethylenically-unsaturated ester copolymers and the core layer is the blend of claim 9.

11. The film laminate of claim 10 wherein the outer layers are ethylene-vinyl acetate copolymer.

* * * * *